United States Patent
Kim et al.

(10) Patent No.: US 9,693,406 B2
(45) Date of Patent: Jun. 27, 2017

(54) CIRCUIT FOR DRIVING AC DIRECT LIGHTING APPARATUS AND METHOD THEREFOR

(71) Applicant: Magnachip Semiconductor, Ltd., Cheongju-si (KR)

(72) Inventors: Hyun Jung Kim, Seoul (KR); Seung Hwan Lee, Seoul (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 13 days.

(21) Appl. No.: 14/809,405

(22) Filed: Jul. 27, 2015

(65) Prior Publication Data

US 2016/0081156 A1    Mar. 17, 2016

(30) Foreign Application Priority Data

Sep. 15, 2014  (KR) .................. 10-2014-0122138

(51) Int. Cl.
*H05B 33/08* (2006.01)

(52) U.S. Cl.
CPC ....... *H05B 33/083* (2013.01); *H05B 33/0854* (2013.01); *H05B 33/0815* (2013.01); *Y02B 20/347* (2013.01)

(58) Field of Classification Search
CPC ............ H05B 33/0815; H05B 33/0845; H05B 33/0848; H05B 33/0851; H05B 37/02; H05B 33/0809; H05B 33/0818; H05B 33/083; H05B 39/04; H05B 39/044; H05B 39/048; H05B 33/0824; H05B 33/0854; H05B 33/0887; H05B 39/08; H05B 41/3924; H05B 33/0812; H05B 33/089; H05B 37/0263; H05B 37/0281; H05B 39/02; H05B 33/08; H05B 33/0833; H05B 33/0839; H05B 33/0842; H05B 33/086; H05B 37/0272; H05B 41/16; H05B 41/2828; H05B 41/392; H05B 41/3925; H02M 7/06; H02M 5/293; H02M 1/081; H02M 1/32; H02M 2001/0006; H02M 2001/0012; H02M 2005/2937;

(Continued)

(56) References Cited

U.S. PATENT DOCUMENTS

| 2012/0068617 | A1* | 3/2012 | Matsuda | H05B 33/0848 315/240 |
| 2014/0239840 | A1* | 8/2014 | Wang | H05B 33/0854 315/224 |
| 2015/0048744 | A1 | 2/2015 | Shin et al. | |

* cited by examiner

*Primary Examiner* — Alexander H Taningco
*Assistant Examiner* — Renan Luque
(74) *Attorney, Agent, or Firm* — NSIP Law

(57) ABSTRACT

Disclosed is a circuit for driving an AC direct lighting apparatus, including a triac dimmer configured to control a brightness of an LED module, a charger configured to be charged during a turn-off period of the triac dimmer, a reference voltage generator configured to generate a reference voltage based on a voltage charged in the charger during a first turn-off period of the triac dimmer and a voltage charged in the charger during a second turn-off period, and a driving signal output unit configured to output a driving signal of the LED module in response to a voltage charged in a third turn-off period of the triac dimmer reaching the generated reference voltage. Accordingly, the driving circuit manages a driving time deviation of the LED module, removing a flicker phenomenon from the light produced by the module.

20 Claims, 6 Drawing Sheets

(58) Field of Classification Search
CPC ......... H02M 3/33507; H02M 3/33515; H02M 5/2573; H02M 7/066; H02M 7/155; H02M 7/217
See application file for complete search history.

CIRCUIT FOR DRIVING AC DIRECT LIGHTING APPARATUS AND METHOD THEREFOR

CROSS-REFERENCE TO RELATED APPLICATION(S)

The application claims the benefit under 35 USC 119(a) of Korean Patent Application No. 10-2014-0122138 filed on Sep. 15, 2014 in the Korean Intellectual Property Office, the entire disclosure of which is incorporated herein by reference for all purposes.

BACKGROUND

1. Field

The following description relates to a driving technology of an AC direct lighting apparatus. The following description also relates to a circuit for driving an AC direct lighting apparatus and a related method. Such a circuit and method are capable of overcoming a deviation of an LED driving time caused by a turn-on characteristic of a triac dimmer.

2. Description of Related Art

LED lighting equipment may reduce power consumption, compared with alternative light sources, so that LED lighting equipment is substituting for conventional lighting fixtures. Recent LED lighting equipment may directly use AC power rather than DC power by adopting an AC direct driving circuit.

For example, it is preferable to use an AC direct scheme rather than a DC power source scheme, because the AC direct scheme is lighter and takes less space. When a triac dimmer is used in an AC direct lighting equipment in the alternatives, there occurs a difference of an operation point at which an LED is turned-on because of a turn-on characteristic of such a dimmer, thereby generating a flicker phenomenon. Here, a triac dimmer refers to a triode for alternating current (TRIAC), which is an electronic component that can conduct current in either direction when it is turned on. That is, the flicker phenomenon potentially occurs when LEDs are turned-on and their lighting times may differ from one another, so that a user of the LED lighting equipment may feel tired or otherwise experience discomfort from the flickering.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples are able to remove a deviation of a LED driving time caused by a turn-on characteristic of a triac dimmer and thereby overcome a flicker phenomenon.

Another example includes a design for a turn-off time of a triac dimmer to keep it the same and to keep a light amount regulated by the dimmer uniform.

In one general aspect, a circuit for driving an AC direct lighting apparatus includes a triac dimmer configured to control a brightness of an LED module, a charger configured to be charged during a turn-off period of the triac dimmer, a reference voltage generator configured to generate a reference voltage based on a voltage charged in the charger during a first turn-off period of the triac dimmer and a voltage charged in the charger during a second turn-off period, and a driving signal output unit configured to output a driving signal of the LED module in response to a voltage charged in a third turn-off period of the triac dimmer reaching the generated reference voltage.

The reference voltage generator may generate the greatest voltage of the voltages charged in the charger during the first and second turn-off periods of the triac dimmer as the reference voltage.

The circuit for driving an AC direct lighting apparatus may further include a driving current controller configured to receive the driving signal in order to control a path of a driving current flowing into the LED module.

The circuit for driving an AC direct lighting apparatus may further include an angle change sensor configured to sense an angle change to the triac dimmer.

The circuit for driving an AC direct lighting apparatus may further include a voltage initialization unit configured to initialize the charged voltage and reference voltage in response to the angle change being sensed.

The driving signal output unit may delay a driving of the LED module until the charged voltage reaches the reference voltage even though an AC input voltage that passes through the triac dimmer is full-wave rectified and applied to the driving signal output unit.

The driving signal output unit may delay a lighting time of the LED module to remove a turn-on time deviation of the dimmer, thereby preventing a flicker phenomenon.

In another general aspect, a method for driving an AC direct lighting apparatus includes charging a bias current during a turn-off period of a triac dimmer, generating a reference voltage based on a voltage charged during a first turn-off period of the triac dimmer and a voltage charged during a second turn-off period of the triac dimmer, and outputting a driving signal of the LED module in response to a voltage charged in a third turn-off period of the triac dimmer reaching the generated reference voltage.

The method for driving an AC direct lighting apparatus may further include receiving the driving signal in order to control a path of a driving current flowing to the LED module.

The method for driving an AC direct lighting apparatus may further include sensing an angle change to the triac dimmer.

The method for driving an AC direct lighting apparatus may further include initializing the charged voltage and reference voltage in response to the angle change being sensed.

In another general aspect, a circuit for driving an apparatus includes a reference voltage generator configured to generate a reference voltage based on a voltage charged in a charger during a first turn-off period of a triac dimmer and a voltage charged in the charger during a second turn-off period of the triac dimmer, and a driving signal output unit configured to output a driving signal of an LED module in response to a voltage charged in a third turn-off period of the triac dimmer reaching the generated reference voltage.

The triac dimmer may be configured to control a brightness of the LED module.

The charger may be configured to be charged during a turn-off period of the triac dimmer.

The reference voltage generator may generate the greatest voltage of the voltages charged in the charger during the first and second turn-off periods of the triac dimmer as the reference voltage.

The circuit for driving an apparatus may further include a driving current controller configured to receive the driving signal in order to control a path of a driving current flowing into the LED module.

The circuit for driving an apparatus may further include an angle change sensor configured to sense an angle change to the triac dimmer.

The circuit for driving an apparatus may further include a voltage initialization unit configured to initialize the charged voltage and reference voltage in response to the angle change being sensed.

The driving signal output unit may delay a driving of the LED module until the charged voltage reaches the reference voltage even though an AC input voltage that passes through the triac dimmer is full-wave rectified and applied to the driving signal output unit.

The driving signal output unit may delay a lighting time of the LED module to remove a turn-on time deviation of the dimmer, thereby preventing a flicker phenomenon.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
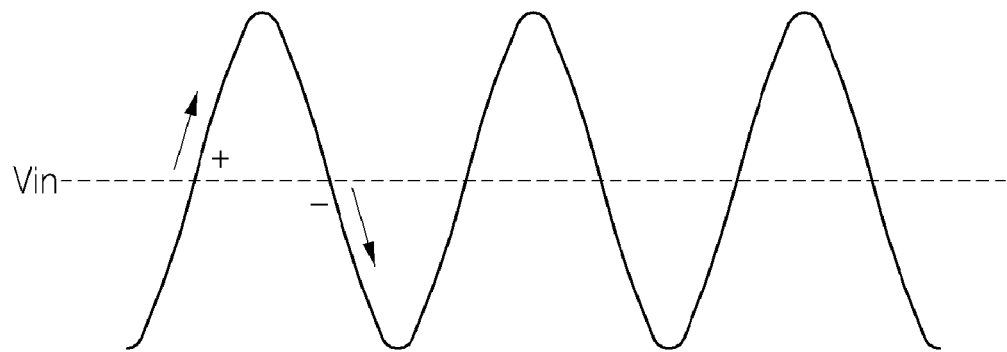
FIGS. 1A-1C are timing diagrams illustrating an operation of a circuit for driving a lighting apparatus in an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Since the description of an example is merely an example for structural and functional explanation of the present examples, the scope of the present examples is not to be construed to be limited to the examples described in the text of this disclosure.

Terms described in the present disclosure are to be understood as follows.

While terms such as "first" and "second," etc., may be used to distinguish one component from another, these terms are not intended to indicate any ordering or specific relationship for the components other than that the components are different components, unless specifically recited.

It is to be understood that when an element is referred to as being "connected to" another element, the element is potentially directly connected to the other element or intervening elements may also be present. In contrast, when an element is referred to as being "directly connected to" another element, it indicates that no intervening elements are present. Meanwhile, other expressions describing relationships between components such as "between", "immediately between" or "adjacent to" and "directly adjacent to" are intended to be construed similarly.

Singular forms, such as "a", "an" and "the" in the present disclosure, are intended to include the plural forms as well, unless the context clearly indicates otherwise. It is to be further understood that terms such as "including" or "having," etc., are intended to indicate the existence of the features, numbers, operations, actions, components, parts, or combinations thereof disclosed in the specification, and these terms are not intended to preclude the possibility that one or more other features, numbers, operations, actions, components, parts, or combinations thereof may exist or may be added in addition to the elements whose existence is disclosed.

The disclosed technology potentially has advantageous effects as follows. However, the disclosure does not mean that a specific example must include all of the following effects or even any of the following effects, or only the following effects. Hence, the technical scopes of the disclosed technology are not to be limited to the disclosed examples, and include other appropriate relevant technologies.

According to a circuit for driving an AC direct lighting apparatus and the method related to the circuit in accordance with an example, it is possible to remove a deviation of a LED driving time caused by a turn-on characteristic of a triac dimmer and thereby overcome a flicker phenomenon.

According to a circuit for driving an AC direct lighting apparatus and the method related to the circuit, in accordance with an example, it is possible to design turn-off times of a triac dimmer to be kept the same and a light amount of it kept uniform.

Figure 1B:
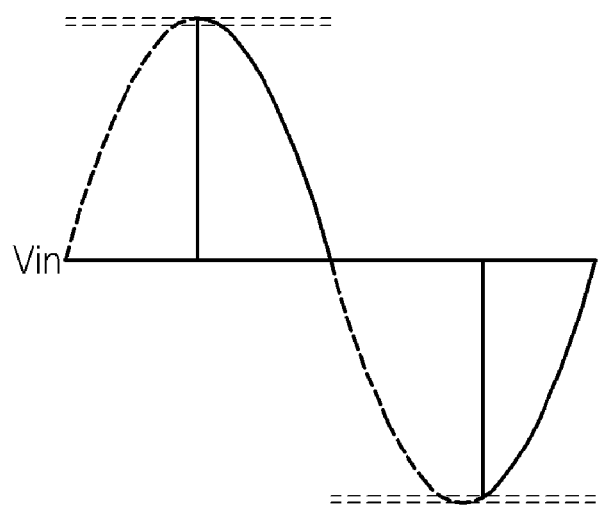
Figure 1C:
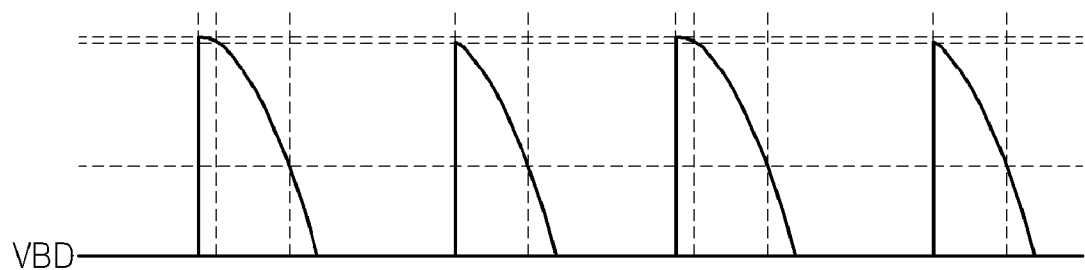
Figure 2:
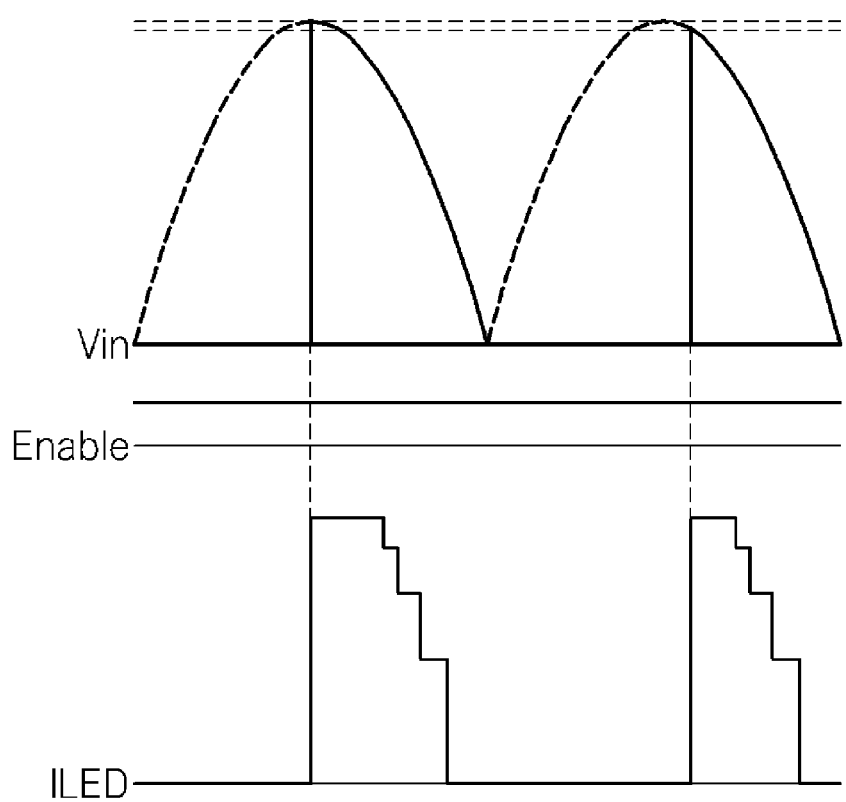
FIG. 2 is a timing diagram illustrating an operation of a lighting apparatus performed by a driving circuit in the example of FIGS. 1A-1C.

FIGS. 1A-C are timing diagrams illustrating an operation of a circuit for driving a lighting apparatus in an alternative example and FIG. 2 is a timing diagram illustrating an operation of a lighting apparatus performed by a driving circuit in FIGS. 1A-1C.

A circuit for driving a lighting apparatus in alternative technologies is potentially serially connected to a triac direct dimmer and a bridge diode. Referring to FIG. 1B, an AC input voltage Vin potentially passes through the triac dimmer so that an angle may be controlled. In such a scenario, the angle of the triac dimmer is arbitrarily controlled by a user. Referring to FIG. 1C, the AC input voltage Vin that passes through the triac dimmer is full-wave rectified through a bridge diode. The AC input voltage VBD that has been full-wave rectified is then applied to a driving circuit to drive a lighting apparatus.

Generally, when the triac dimmer repeats a turn-on and a turn-off operation, differences of operating point potentially occur repeatedly since a forward turn-on characteristic and a reverse turn-on characteristic of the triac dimmer are different from each other. Accordingly, since a driving time of the LED module corresponds to a turn-on time of the triac dimmer, there potentially occurs a flicker phenomenon due to the differences in the operating point of the driving current ILED flowing into the LED module.

Figure 3:
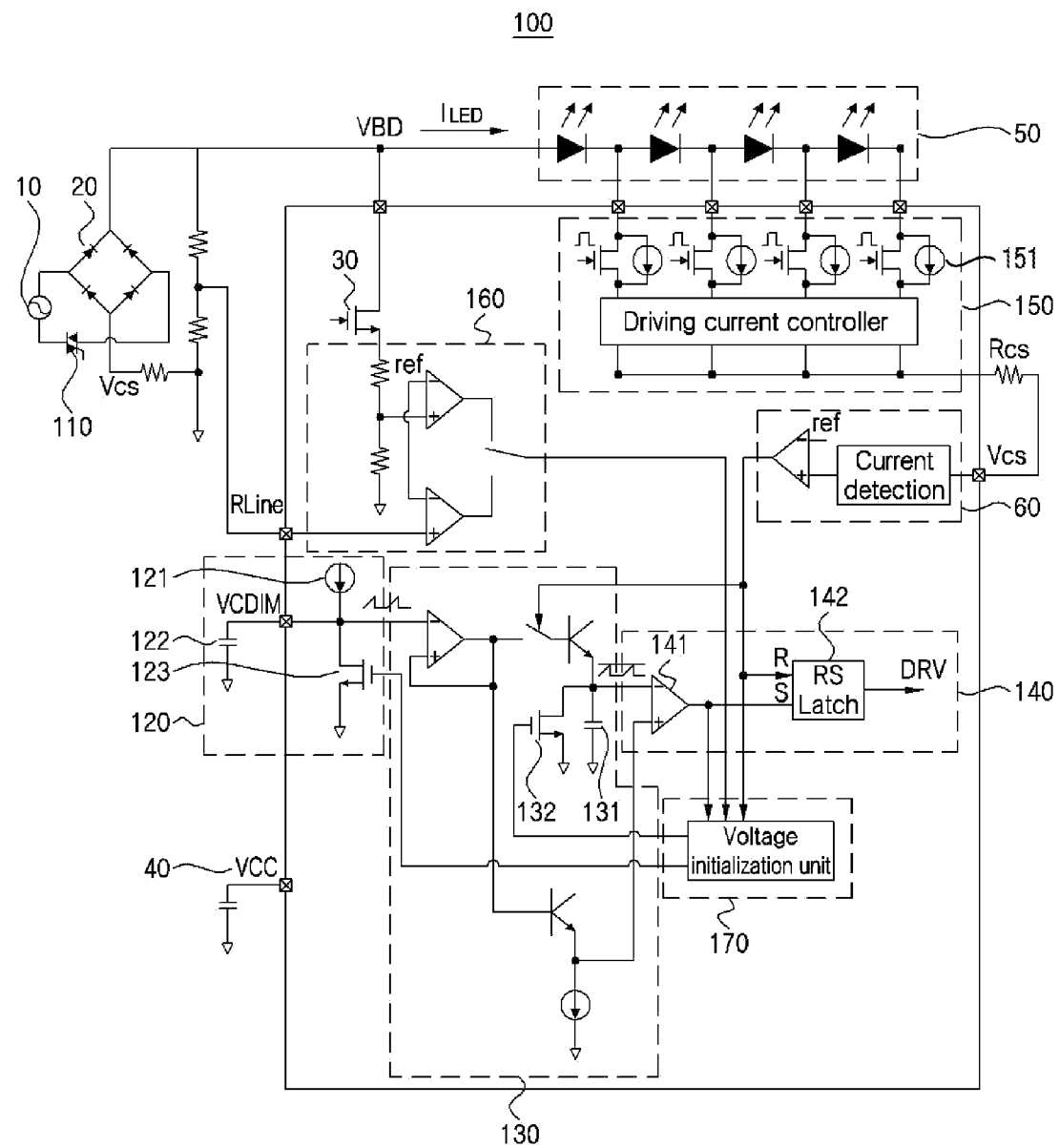
FIG. 3 is a circuit diagram illustrating a circuit for driving an AC direct lighting apparatus in accordance with an example.

FIG. 3 is a circuit diagram illustrating a circuit for driving an AC direct lighting apparatus in accordance with an example.

Referring to the example of FIG. 3, a driving circuit 100 includes an AC input power source 10, a bridge diode 20, a power supply switching device 30, a device voltage supply module 40, a triac dimmer 110, a charger 120, a reference voltage generator 130, a driving signal output 140, a driving current controller 150, an angle change sensor 160, a voltage initialization unit 170, an LED module 50 and a feedback signal transmission module 60.

The AC input power source 10 corresponds to a source of the AC input voltage Vin. For example, a frequency of the AC input voltage Vin may correspond to 50 Hz or 60 Hz depending on a power supplier, but the frequency of the AC input voltage is not necessarily limited thereto, and the frequency of the AC input voltage Vin also possibly fluctuates depending on a current distribution system.

In the example of FIG. 3, the bridge diode 20 is electrically connected to the AC input power source 10 to connect a plurality of diodes one another. The AC input voltage Vin passes through the triac dimmer 110 and then is full-wave rectified through the bridge diode 20. The full-wave rectified AC input voltage VBD is provided to the LED module 50.

In this example, the power supply switching source 30 is connected to the bridge diode 20 to supply the driving circuit 100 with power. That is, the input power voltage VBD is provided to the driving circuit 100 through the power supply switching device 30. In one example, the power supply switching device 30 takes the form of a transistor. Such a transistor is turned on when a voltage is applied to its base terminal.

Also, the bias voltage supply module 40 provides the driving circuit 100 with a bias voltage VCC to stabilize the input voltage VBD. More specifically, the bias voltage VCC reduces the input voltage VBD to the extent that the driving circuit 100 requires it.

For example, the triac dimmer 110 is serially connected to the AC input power source 10 and bridge diode 20. The triac dimmer 110 changes its angle to control a brightness of the LED module 50. The triac dimmer 110 requires a minimum holding current of about 30 to 50 mA during a time period, and there potentially occurs a flicker phenomenon that the LED module 50 flickers when the triac dimmer 110 is not able to sustain the minimum holding current. Generally, when the triac dimmer 110 repeats a turn-on and a turn-off operation, differences of operating points occur, which generate a flicker phenomenon.

In the example of FIG. 3, the charger 120 includes a bias current 121, a first capacitor 122, and a first discharge switching device 123.

The charger 120 is charged during a turn-off period of the triac dimmer 110. More specifically, when the triac dimmer 110 is tuned off, the first discharge switching device 123 is turned off so that a current cannot flow into the first discharge switching device 123. Accordingly, the bias current 121 flows into the first capacitor 122 in order to charge the first capacitor 122. That is, the charged voltage VCDIM is proportional to a turn-off time of a current period of the triac dimmer 110. Accordingly, the longer the turn-off time, the higher the charged voltage VCDIM.

In one example, when the capacitor 122 is charged with the bias current 121, the charged voltage VCDIM is output in a form of saw tooth wave. When the bias current 121 flows into the first capacitor 122, the capacitor 122 is charged with the voltage VCDIM according to Mathematical Expressions 1 and 2 below.

$$i = C*(Dv/dt)$$ Mathematical Expression 1

Rearranging Mathematical Expression 1 provides Mathematical Expression 2.

$$V = i/C*\int dt$$ Mathematical Expression 2

In the example of FIG. 3, the reference voltage generator 130 includes the second capacitor 131 and second discharge switching device 132, and is potentially arranged between the charger 120 and the driving signal output unit 140.

The reference voltage generator 130 generates a reference voltage VREF based on a voltage VCDIM1 charged in the charger 120 in a first turn-off period of the triac dimmer 110 and a voltage VCDIM2 charged in a second turn-off period of the triac dimmer 110. More specifically, the reference voltage generator 130 compares the voltages VCDIM1 and VCDIM2 to each other that were charged in the first and second turn-off periods. The reference voltage generator 130 then charges the higher voltage in the second capacitor 131. That is, the reference voltage VREF corresponds to the highest voltage among voltages VCDIM charged in the charger 120. The reference voltage generator 130 determines the maximum turn-off time of the triac dimmer 110 using the reference voltage VREF.

In the example of FIG. 3, the driving signal output unit 140 includes an OP amplifier module 141 and an RS latch module 142. The driving signal output unit 140 outputs a driving signal DRV of the LED module when the voltage VCDIM charged in a third turn-off period of the triac dimmer 110 reaches the generated reference voltage VREF. More specifically, a negative (−) terminal of the OP amplifier module 141 receives the reference voltage VREF and a positive (+) terminal receives a charging voltage VCDIM. The OP amplifier module 141 compares voltages applied to the input terminals, that is, the positive (+) and negative (−) terminals to each other to provide an S terminal of the RS latch module 142 with the output voltage. Further, the RS latch module 142 receives a feedback signal in its R terminal so as to output the driving signal DRV.

Figure 4:
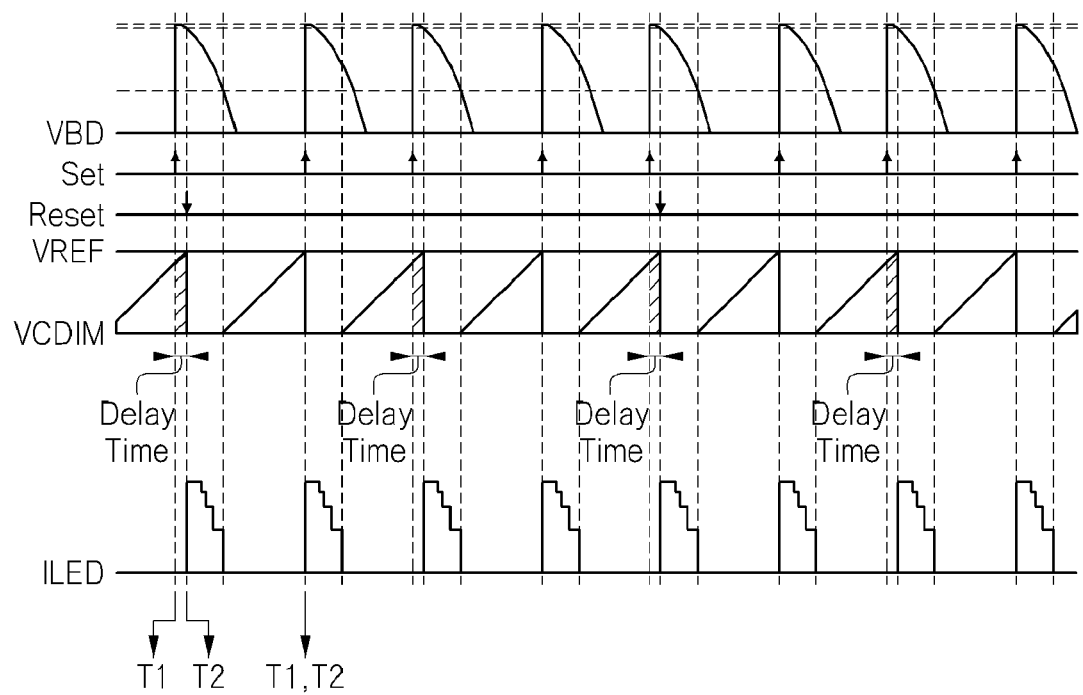
FIG. 4 is a timing diagram illustrating an operation of a driving circuit in the example of FIGS. 1A-1C.

FIG. 4 is a timing diagram illustrating an operation of a driving circuit in the examples of FIGS. 1A-1C.

Referring to FIG. 4, the driving signal output unit 140 delays the driving of the LED module 50 until the charging voltage VCDIM reaches the reference voltage VREF, even though a full-wave rectified AC input voltage VBD is input to the driving signal output unit 140. More specifically, a Set signal is output when the triac dimmer 110 turns on, and a Reset signal is output when the charging voltage VCDIM reaches the reference voltage. Since a forward turn-on characteristic and a reverse turn-on characteristic of the triac dimmer 110 are different from each other, the Set signal is output without a predetermined period. That is, when the Set signal is output, a full-wave rectified AC input voltage VRD is applied to the driving signal output unit 140 but the first capacitor 122 is potentially charged until the Reset signal is output. The voltage charged in the first capacitor 122, VCDIM, is proportional to a turn-off time of a current period of the triac dimmer 110, and the time when the charging voltage VCDIM reaches the reference voltage VREF corresponds to the maximum turn-off time of the triac dimmer 110. That is, the time when the driving of the LED module 50 is delayed, Delay Time, corresponds to a gap between a time point T2 when a charging voltage VCDIM reaches the reference voltage VREF and a time point T1 when an input voltage VBD is applied. Accordingly, the driving signal output unit 140 outputs a driving signal DRV at a time point T2 when the charging voltage VCDIM reaches the reference voltage VREF, providing the driving current controller 150 with the driving signal DRV. That is, the driving circuit 100 removes a driving signal deviation of the LED module 50 caused by a turn-on characteristic of the triac dimmer 110 and overcomes a flicker phenomenon. Further, the driving circuit 100 is designed to keep turn-off time of the triac dimmer 110 the same and light amount of the LED module uniform, by virtue of being able to overcome the flicker phenomenon as discussed above.

Referring to the example of FIG. 3 again, the driving current controller 150 is connected to the driving signal output unit 140 and LED module 50. In one example, the driving current controller 150 includes the driving switching device 151 to correspond to the number of the LED modules 50. The driving switching device 151, in an example, takes on the form of a transistor.

The driving current controller 150 receives the driving signal DRV to control a path of the driving current ILED flowing into the LED module 50. More specifically, the driving current controller 150 receives the driving signal DRV from a gate terminal of the driving switching device 151 to control the driving current ILED. That is, the driving current controller 150 enables the driving current ILED to flow depending on whether it receives the driving signal DRV or not, regardless of an input voltage VBD applied.

In the example of FIG. 3, an angle change sensor 160 is connected to the power supply switching device 30. The angle change sensor 160 receives an input voltage VBD when the power supply switching device 30 is turned-on. The angle change sensor 160 compares the received input voltage VBD and an internal reference voltage ref to sense an angle change into the triac dimmer 110. The angle change sensor 160 senses an angle change to transmit a sensing signal to a voltage initialization unit 170. The angle of the triac dimmer 110 controls a time when an AC input voltage VBD that has been full-wave rectified in a period is applied to the driving circuit 100. In one example, when changing an angle of the triac dimmer 110, a turn-off time of the triac dimmer 110 is increased or decreased. When the turn-off time of the triac dimmer 110 is decreased, a time when the charger 120 is charged with voltage is correspondingly decreased and a time when a driving signal DRV is transmitted is correspondingly increased. Accordingly, a driving time of the driving current ILED and a turn-on time of the LED module 50 are correspondingly increased, too. Thus, when a turn-off time of the triac dimmer 110 is decreased, in such an example, the LED module 50 is brighter.

Figure 5:
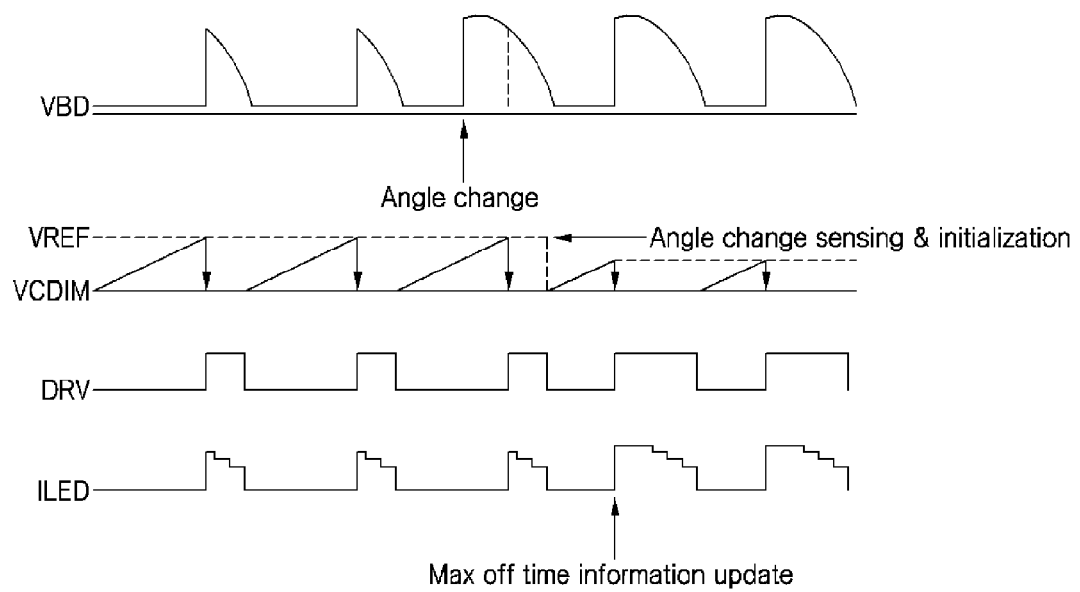
FIG. 5 is a timing diagram illustrating an operation of a voltage initialization unit in the example of FIGS. 1A-1C.

FIG. 5 is a timing diagram illustrating an operation of a voltage initialization unit in the example of FIGS. 1A-1C.

Referring to FIGS. 3 and 5, a voltage initialization unit 170 is connected to a feedback signal transmission module 60, an OP amplifier module 141 and an angle change sensor 160.

The voltage initialization unit 170 receives a feedback signal from the feedback signal transmission module 60 when the driving current ILED flows into the LED module 50. When the voltage initialization unit 170 receives the feedback signal, it transmits an enable signal to the first discharge switching device 123 to cause it to discharge the first capacitor 122. That is, when the driving current ILED flows into the LED module 50, the voltage initialization unit 170 initializes the voltage charged into the first capacitor 122.

When the angle change is sensed, the voltage initialization unit 170 initializes the charged voltage VCDIM and reference voltage VREF. More specifically, when the angle change is sensed, the voltage initialization unit 170 receives a sensing signal from the angle change sensor 160. When the voltage initialization unit 170 receives the sensing signal, it transmits an enable signal to the first and second discharge switching devices 123 and 132 to discharge the first and second capacitors 122 and 131. That is, the voltage initialization unit 170 discharges the first and second capacitors 122 and 131 to initialize the charged voltages VCDIM and reference voltage VREF.

In the example of FIG. 3, the LED module 50 is arranged between the bridge diode 20 and driving current controller 150. The LED module 50 receives an AC input voltage VBD that has been full-wave rectified in the bridge diode 20 to be driven through the driving current controller 150. More specifically, the LED module 50 is driven depending on whether the driving switching device 151 is turned-on or turned-off, regardless of the input voltage VBD applied.

Also in the example of FIG. 3, the feedback signal transmission module 60 is arranged between the driving current controller 150 and the voltage initialization unit 170. For example, the feedback signal transmission module 60 transmits the feedback signal to the voltage initialization unit 170 when the driving current ILED flows into the LED module 50. More specifically, a positive (+) terminal of the feedback signal transmission module 60 receives a driving voltage VCS generated in the driving current ILED and a negative (−) terminal of the feedback signal transmission module 60 receives an internal reference voltage ref. The feedback signal transmission module 60 compares the received driving voltage VCS and the received internal reference voltage ref to output a feedback signal.

Figure 6:
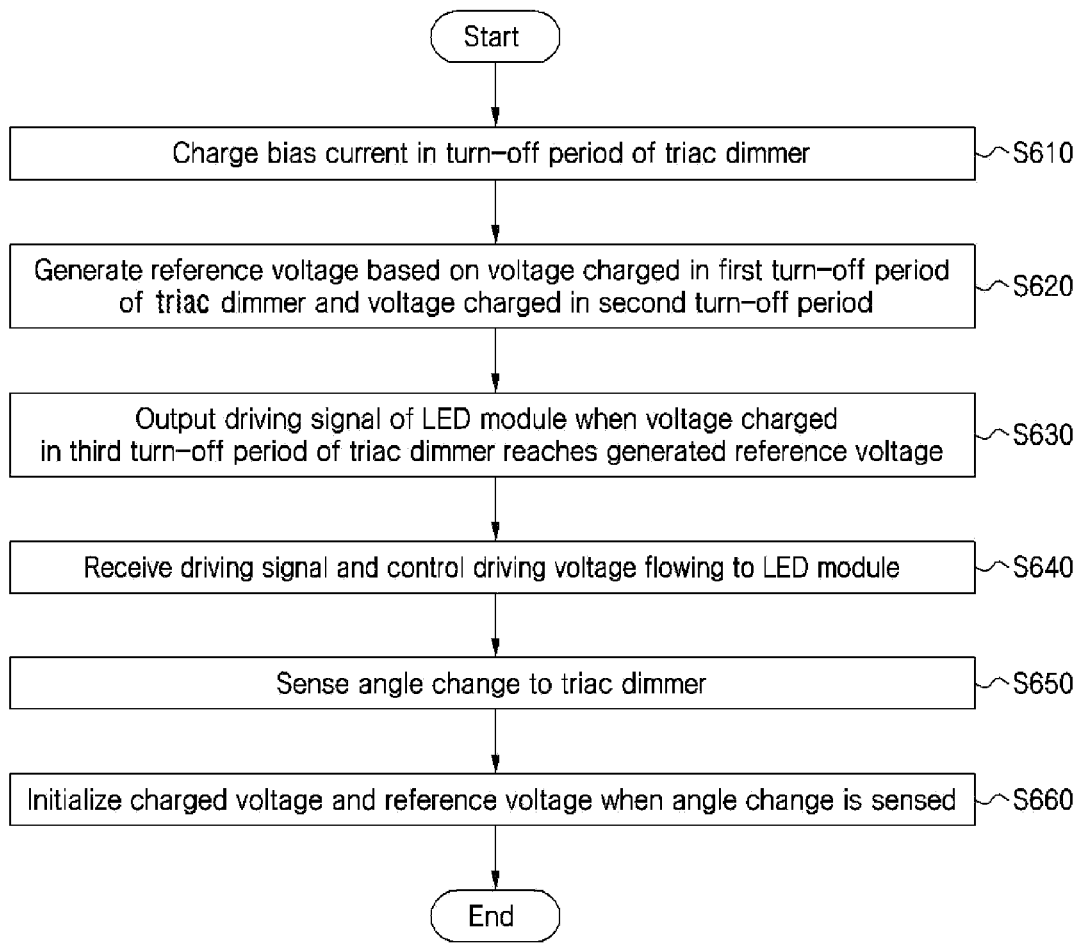
FIG. 6 is a flow chart illustrating a method for driving an AC direct lighting apparatus in accordance with an example.

FIG. 6 is a flow chart illustrating a method for driving an AC direct lighting apparatus in accordance with an example.

In step S610, the charger 120 charges the first capacitor 122 with the bias current 121 in a turn-off period of the triac dimmer 110. For example, when the triac dimmer 110 is turned-off, the first discharge switching device 123 is turned-off and the bias current 121 flows into the first capacitor 122.

In step S620, the reference voltage generator 130 compares the voltage VCDIM1 charged in the first turn-off period of the triac dimmer 110 and the voltage VCDIM2 charged in the second turn-off period of the triac dimmer 110 with each other. The reference voltage generator 130 compares the voltages VCDIM1 and VCDIM2 charged in the first and second turn-off periods with each other to store the higher voltage in the second capacitor 131. That is, the reference voltage generator 130 stores the highest voltage among voltages charged in the charger 120 in order to generate the reference voltage VREF.

In step S630, the driving signal output unit 140 outputs the driving signal DRV of the LED module 50 at a time point T2 when the voltage VCDIM charged in a third turn-off period of the triac dimmer 110 reaches the generated reference voltage, providing the driving current controller 150 with the driving signal DRV.

In step S640, the driving current controller 150 receives the driving signal DRV to control a path of the driving current ILED flowing into the LED module 50. The driving current controller 150 enables the driving current to flow depending on whether it receives a driving signal or not, regardless of whether the input voltage VBD is applied or not. Accordingly, the driving circuit 100 removes a turn-on time deviation of the LED module 50, thereby overcoming a flicker phenomenon.

In step S650, the angle change sensor 160 receives the input voltage VRB when the power supply switching device 30 is turned-on. The angle change sensor 160 compares the received input voltage VBD and internal reference voltage ref to each other to sense an angle change to the triac dimmer 110.

In step S660, the voltage initialization unit 170 receives a sensing signal from the angle change sensor 160 in order to transmit an enable signal to the first and second discharge switching devices 123 and 132. The voltage initialization unit 170 transmits the enable signal to discharge the first and second capacitors 122 and 131, thereby initializing the charged voltage VCDIM and reference voltage VREF.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

DESCRIPTIONS OF SYMBOLS

10: AC input power supply
20: bridge diode
30: power supply switching device
40: bias voltage supply module
50: LED module
60: feedback signal transmission module
100: circuit for driving AC direct lighting apparatus
110: triac dimmer
120: charger
121: bias current
122: first capacitor
123: first discharge switching device
130: reference voltage generator
131: second capacitor
132: second discharge switching device
140: driving signal output unit
141: OP amplifier 142: RS latch module
150: driving current controller
160: angle change sensor
170: voltage initialization unit

What is claimed is:

1. A circuit for driving an alternating current (AC) direct lighting apparatus, comprising:
   a triac dimmer configured to control a brightness of a light emitting diode (LED) module;
   a charger configured to be charged during a turn-off period of the triac dimmer;
   a reference voltage generator configured to generate a reference voltage based on a voltage charged in the charger during a first turn-off period of the triac dimmer and a voltage charged in the charger during a second turn-off period; and
   a driving signal output circuit configured to output a driving signal of the LED module in response to a voltage charged in a third turn-off period of the triac dimmer reaching the generated reference voltage.

2. The circuit for driving an AC direct lighting apparatus of claim 1, wherein the reference voltage generator generates the greatest voltage of the voltages charged in the charger during the first and second turn-off periods of the triac dimmer as the reference voltage.

3. The circuit for driving an AC direct lighting apparatus of claim 1, further comprising a driving current controller configured to receive the driving signal in order to control a path of a driving current flowing into the LED module.

4. The circuit for driving an AC direct lighting apparatus of claim 1, further comprising an angle change sensor configured to sense an angle change to the triac dimmer.

5. The circuit for driving an AC direct lighting apparatus of claim 4, further comprising a voltage initialization circuit configured to initialize the charged voltage and reference voltage in response to the angle change being sensed.

6. The circuit for driving an AC direct lighting apparatus of claim 1, wherein the driving signal output circuit delays a driving of the LED module until the charged voltage reaches the reference voltage even though an AC input voltage that passes through the triac dimmer is full-wave rectified and applied to the driving signal output circuit.

7. The circuit for driving an AC direct lighting apparatus of claim 6, wherein the driving signal output circuit delays a lighting time of the LED module to remove a turn-on time deviation of the dimmer, thereby preventing a flicker phenomenon.

8. A method for driving an alternating current (AC) direct lighting apparatus, comprising:
   charging a bias current during a turn-off period of a triac dimmer;
   generating a reference voltage based on a voltage charged during a first turn-off period of the triac dimmer and a voltage charged during a second turn-off period of the triac dimmer; and
   outputting a driving signal of a light emitting diode (LED) module in response to a voltage charged in a third turn-off period of the triac dimmer reaching the generated reference voltage.

9. The method for driving an AC direct lighting apparatus of claim 8, further comprising receiving the driving signal in order to control a path of a driving current flowing to the LED module.

10. The method for driving an AC direct lighting apparatus of claim 9, further comprising sensing an angle change to the triac dimmer.

11. The method for driving an AC direct lighting apparatus of claim 10, further comprising initializing the charged voltage and reference voltage in response to the angle change being sensed.

12. A circuit for driving an apparatus, comprising:
    a reference voltage generator configured to generate a reference voltage based on a voltage charged in a charger during a first turn-off period of a triac dimmer and a voltage charged in the charger during a second turn-off period of the triac dimmer; and a driving signal output circuit configured to output a driving signal of a light emitting diode (LED) module in response to a voltage charged in a third turn-off period of the triac dimmer reaching the generated reference voltage.

13. The circuit for driving an apparatus of claim 12, wherein the triac dimmer is configured to control a brightness of the LED module.

14. The circuit for driving an apparatus of claim 12, wherein the charger is configured to be charged during a turn-off period of the triac dimmer.

15. The circuit for driving an apparatus of claim 12, wherein the reference voltage generator generates the greatest voltage of the voltages charged in the charger during the first and second turn-off periods of the triac dimmer as the reference voltage.

16. The circuit for driving an apparatus of claim 12, further comprising a driving current controller configured to receive the driving signal in order to control a path of a driving current flowing into the LED module.

17. The circuit for driving an apparatus of claim 12, further comprising an angle change sensor configured to sense an angle change to the triac dimmer.

18. The circuit for driving an apparatus of claim 17, further comprising a voltage initialization circuit configured to initialize the charged voltage and reference voltage in response to the angle change being sensed.

19. The circuit for driving an apparatus of claim 12, wherein the driving signal output circuit delays a driving of the LED module until the charged voltage reaches the reference voltage even though an AC input voltage that passes through the triac dimmer is full-wave rectified and applied to the driving signal output circuit.

20. The circuit for driving an apparatus of claim 19, wherein the driving signal output circuit delays a lighting time of the LED module to remove a turn-on time deviation of the dimmer, thereby preventing a flicker phenomenon.

* * * * *